Nov. 29, 1927.
1,651,343
J. P. COPLAND
APPARATUS FOR USE IN UNITING METALLIC ARTICLES
Original Filed March 15, 1922   2 Sheets-Sheet 1
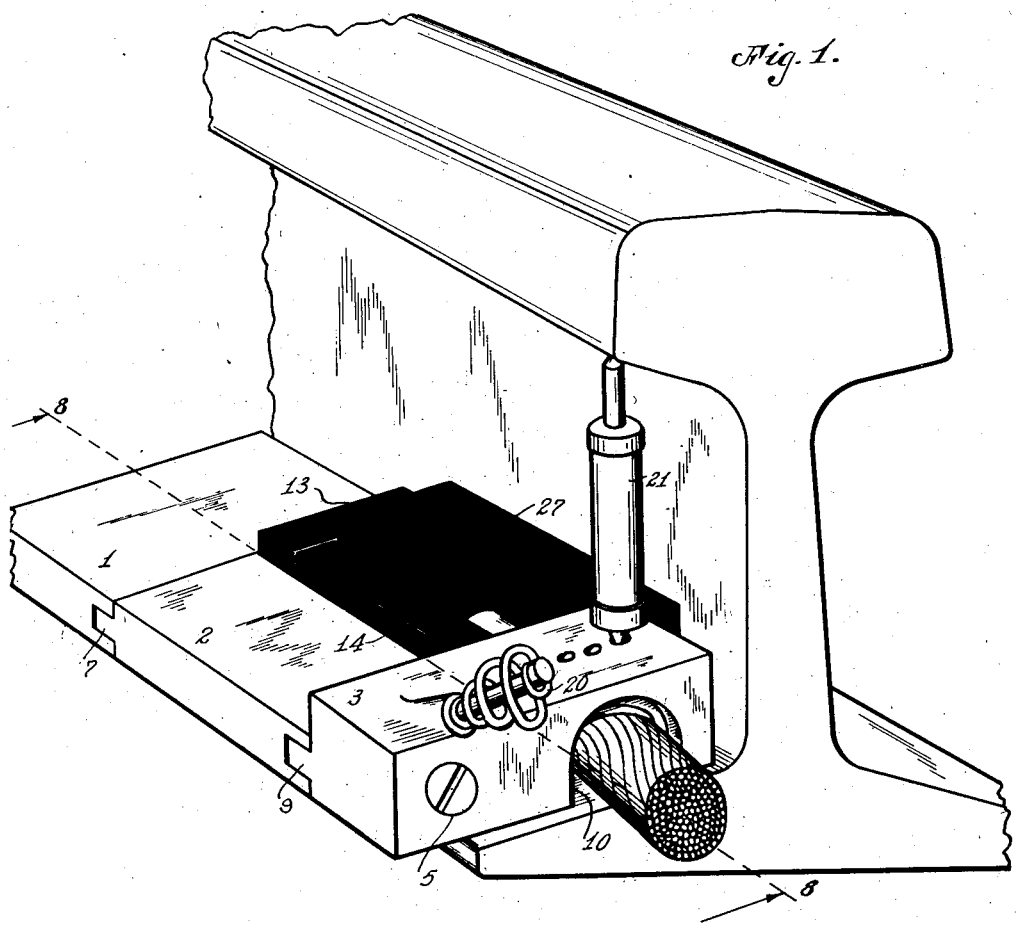
Fig. 1.
Fig. 8.
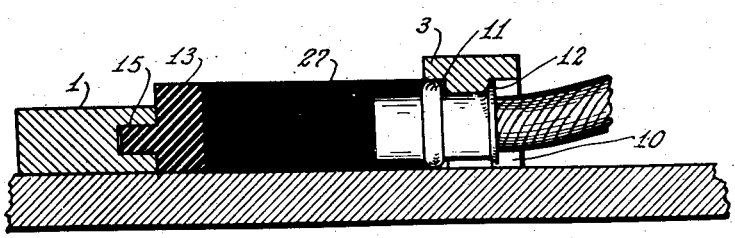
INVENTOR
James P. Copland
BY
B. D. Watts
ATTORNEY Nov. 29, 1927.　　　　　　　　　　　　　　　　　　　1,651,343
J. P. COPLAND
APPARATUS FOR USE IN UNITING METALLIC ARTICLES
Original Filed March 15, 1922　　2 Sheets-Sheet 2

INVENTOR
James P. Copland
BY
ATTORNEY

Patented Nov. 29, 1927.

1,651,343

UNITED STATES PATENT OFFICE.

JAMES P. COPLAND, OF HUDSON, OHIO, ASSIGNOR TO UNA WELDING AND BONDING COMPANY, A CORPORATION OF DELAWARE.

APPARATUS FOR USE IN UNITING METALLIC ARTICLES.

Application filed March 15, 1922, Serial No. 543,975. Renewed April 16, 1927.

This invention relates to apparatus for use in joining metallic articles and is particularly concerned with a mold for use in cast welding or brazing copper bonds to the base of railway rails.

One object of the invention is to provide a new and improved form of apparatus for attaching copper bonds to the base of railway rails.

Another object is to construct a mold for use in uniting metallic articles, adapted to exert a cooling or heat dissipating influence on the articles being united.

Another object is to provide an apparatus for attaching copper base bonds to rails adapted to maintain the melted copper in molten condition until it alloys with the rail and at the same time to prevent excessive heating of the rail itself.

Another object is to provide a multipart mold for base bonds having suitable casting cavity liners replaceably secured therein.

Another object of the invention is to provide an apparatus for securing bonds to rail bases adapted to seat on a rail base and adjustable means for engaging the rail and apparatus to secure the latter in position.

Further objects will appear and be pointed out hereinafter.

Although various structures embodying my invention can be constructed I have elected to describe for purposes of illustration a type of apparatus adapted to the joining of copper bonds to the bases of railway rails. It is to be understood however, that I am not limiting myself to this particular type of mold since, I contemplate similar apparatus adapted to the joining of two or more cables, for example, and other various articles.

In the drawings accompanying and forming a part of this specification:

Fig. 1 is a perspective view of my improved form of apparatus for use in joining bonds to rail bases, the apparatus being assembled with a rail and a bond in position.

Fig. 8 is a cross sectional view taken substantially on 8—8 of Fig. 1, showing the relative position of bond, rail and apparatus.

Figure 2:
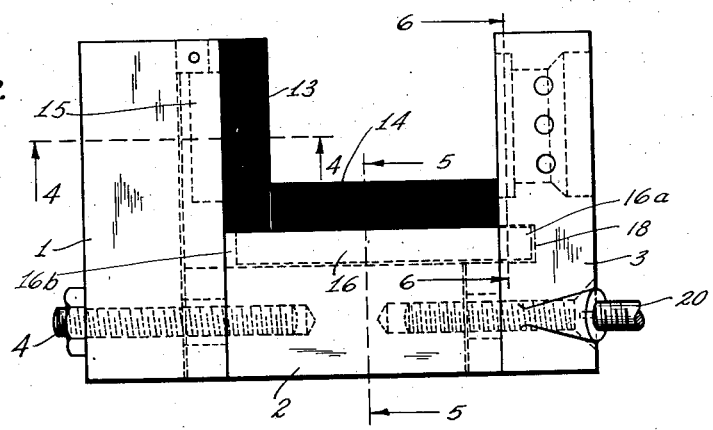
Fig. 2 is a top plan view of the apparatus shown in Fig. 1.
Figure 3:
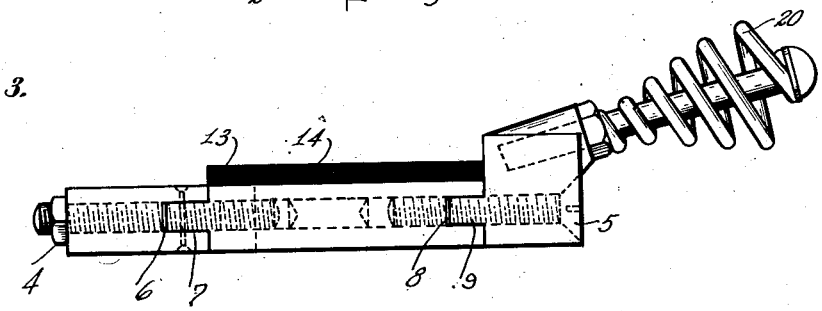
Fig. 3 is a side elevation thereof.
Figure 7:
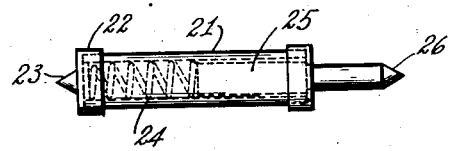
Fig. 7 shows the spring jack used in securing the improved form of apparatus to a rail.
Figure 4:
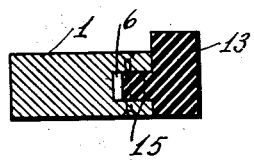
Figs. 4, 5 and 6 are respectively cross sectional views taken on lines 4—4, 5—5, 6—6 of Fig. 2.
Figure 5:
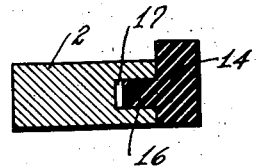
Figure 6:
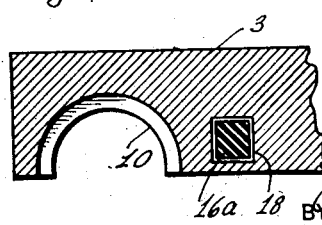

My improved form of apparatus comprises a plurality of rectangular plates 1, 2 and 3 arranged edge to edge and detachably secured together by suitable means, such as screws 4 and 5 and constituting a metal mold body. Plate 1 has a groove 6 extending for nearly the entire length of one side into which a corresponding tongue 7 formed on the end of member 2 projects. In the other end of plate 2 a similar groove 8 seats an upstanding tongue 9 formed integral with plate 3, the screws 4 and 5 and the interengaging and groove connections thus serving to provide a substantially rigid structure. It will be noted that plates 1 and 2 are of approximately the same thickness and that all three plates have their lower side surfaces in the same plane. Plate 3 which preferably is thicker than plates 1 and 2 has its lower face cut away to provide a recess 10 adapted to receive the terminal portion of a rail bond. Various forms of recesses can obviously be used, but the one here shown is suited to the illustrated form of bond which has a terminal clip with an intermediate raised rib 11 extending around the bond and with an outwardly flared edge 12.

To provide means for preventing premature chilling of molten metal, for example copper, melted in the process of attaching the bonds, I have provided liner members 13 and 14 composed of refractory or heat resistant, relatively poor heat conducting material, preferably carbon or graphite, which are adapted to lie adjacent the bond end and to form the surface of the casting cavity which engages with the molten metal. These members 13 and 14 which are slightly wider than the thickness of the plates 1 and 2 are provided with outstanding tongues 15 and 16 respectively adapted to seat in groove 6 of plate 1, and a similar groove 17 in plate 2. It will be observed that tongue 16 of member 14 extends beyond the main body thereof as at 16$^a$ and 16$^b$, the extension 16$^a$ being received in a recess 18 in the side face of plate 3, and the extension 16$^b$ serving as a means by which member 13 may assist in retaining member 14 in assembled position.

In assembling the mold, plates 1, 2 and 3 are loosely secured together by screws 4 and 5. Member 14 is then assembled with portion 16ᵃ projecting into slots 18, and member 13 is placed in position with tongue 15 seated in groove 6, whereupon the screws 4 and 5 are turned to draw the various parts into close fitting engagement.

A handle 20 for the mold is provided on one of the members as shown.

Inasmuch as the modification of mold herein shown is adapted to seat on the base of a rail where it may be displaced by vibration due to cars moved on the rails, or otherwise, I have provided means for retaining the mold in proper position. This means preferably comprises a cylinder 21 having a cap 22 provided with a projection 23. Within the cylinder a coil spring 24 is mounted to press against one end of a plunger 25 which has a projection 26. Handles (not shown) may be secured to each of these parts to assist in manipulation thereof, if desired. With the mold in position on the rail base the spring 24 is compressed sufficiently to permit points 23 and 26 to engage with the rail head and recesses on the top surface of plate 3 to thereby retain the mold in position on the rail.

I prefer to close the open side of the casing cavity in my mold body with a member which has properties similar to members 13 and 14 and in the modification shown have provided a member 27 composed of graphite or carbon. When the mold body is positioned on the rail base member 27 it is held in place between the mold body and the adjacent vertical part of the rail as illustrated thereby forming a boxlike casting cavity around the bond end and preventing quick chilling of the molten metal as well as absorbing or deflecting much of the heat which otherwise would be taken up by the rail. In addition member 27 prevents adherence of the copper to parts of the rail other than those with which union is desired.

My improved form of apparatus being composed of heat resisting relatively poor heat conducting material in contact with the molten metal serves to retain the heat in the molten metal for a considerable period of time and facilitates a perfect junction of the copper to the steel. The metal plates outside of these members being formed of good heat conducting material serves to absorb heat from the rail with which they contact and from the members 13 and 14, and to radiate or dissipate the heat absorbed therefrom. If desired cooling means such as fins may be formed on these members, or cooling fluid may be passed through cavities therein as will be readily understood without illustration by those skilled in the art.

Having thus described my invention, what I desire to secure by Letters Patent is defined by what is claimed.

What is claimed:

1. An apparatus for use in uniting metallic articles comprising in combination, a flat metal body having a recess in one edge, refractory members constituting a liner for said recess, and a second recess in the body communicating with the first said recess and adapted to receive one of the metallic articles to be united.

2. An apparatus for use in uniting metallic articles comprising in combination, a plurality of metal members detachably secured together and constituting a metal heat absorbing and conducting body, a recess in one edge of the said body, refractory members constituting a liner for the said recess, and a second recess in the edge of one of the said sheet metal members communicating with the first said recess and adapted to receive one of the metallic articles to be united.

3. An apparatus for use in uniting metallic articles comprising in combination, a plurality of metal plates arranged edge to edge and having inter-locking engagement with each other to form a metal body, means securing the plates in assembled relation, a recess in one edge of the said body, refractory members constituting a liner for said recess, and a second recess formed in the face of the said mold body and communicating with the first said recess, the second said recess being adapted to receive one of the metallic articles to be united.

4. An apparatus for use in uniting metallic articles comprising in combination, a metal body consisting of a plurality of metal plates arranged edge to edge and having tongue and groove connection with each other, means detachably securing the plates in assembled relation, a recess formed in one edge of the said body and having an open side, refractory members secured to the said body, a liner for certain sides of the said recess, a refractory member constituting a closure for the open side of the said recess, and a second recess formed in the said metal body to communicate with the first said recess and adapted to receive one of the metallic articles to be united.

5. An apparatus for use in uniting two or more metallic articles comprising in combination, a flat rectangular metal body having a rectangular recess extending into one edge thereof, the said body being adapted to seat on one of the articles to be united, apertures in the edges of the said articles, carbon members having tongues adapted to seat in the said apertures, the said members constituting liners for the said recess, a carbon member constituting a closure for the open end of the said recess, and a second recess formed in the said metal body extending into the first said recess and adapted to receive another of the said articles to be united.

6. An apparatus for use in uniting metallic articles comprising a metal body adapted to seat on a rail base, an open ended recess formed in one edge of the said body, grooves in the edges of the said body adjacent the said recess, refractory members having tongues adapted to seat in the said grooves and constituting liners for the said recess, a refractory member constituting a closure for the open end of the said recess and a second recess in the lower face of the said body whereby a bond may be projected into the first said recess.

7. An apparatus for use in uniting metallic articles comprising a metal body composed of a plurality of metal plates the said plates being arranged edge to edge and having tongue and groove arrangement with each other, a recess in the said body carbon members constituting liners for the said recess, means for detachably securing the said plates and carbon members in assembled relation, and a second recess in one of the said plates communicating with the first said recess.

8. An apparatus for use in uniting metallic articles comprising in combination, a metal body having a substantially, rectangular recess formed therein, carbon members constituting liners for three sides of the said recess and a second recess formed in the said metal body and communicating with the first said recess along the fourth and unlined side thereof.

9. An apparatus for use in attaching bonds to rail bases comprising in combination, a metal body adapted to seat on a rail base and to cooperate therewith in receiving the bond end and forming a mold for molten metal adjacent the said end, and means for maintaining the said body in position on the rail base comprising a spring pressed member adapted to engage the head of the rail and a top of the said metal body whereby the latter is held in position on the rail base.

10. An apparatus for use in attaching bonds to rail bases comprising in combination, a metal body adapted to seat on a rail base and to cooperate therewith in receiving a bond end and forming a mold for molten metal adjacent the said end, and means for maintaining the said metal body in position on the rail base.

11. An apparatus for use in attaching bonds to rail bases comprising in combination, a metal body adapted to seat on a rail base and to cooperate therewith in receiving a bond end and forming a mold for molten metal adjacent the said end, and means for maintaining the said metal body in position on the rail base, comprising an adjustable member adapted to engage the top of said body and the rail head.

12. An apparatus for use in uniting metallic articles comprising in combination, a metal body adapted to absorb and dissipate heat relatively rapidly as compared with steel, said metal body forming a mold for molten metal adjacent a portion of one of said articles, and means for maintaining the said metal body in fixed position on another of said article.

In testimony whereof, I hereunto affix my signature.

JAMES P. COPLAND.